(12) United States Patent
Busaba et al.

(10) Patent No.: US 8,806,139 B2
(45) Date of Patent: Aug. 12, 2014

(54) CACHE SET REPLACEMENT ORDER BASED ON TEMPORAL SET RECORDING

(75) Inventors: Fadi Y. Busaba, Poughkeepsie, NY (US); Steven R. Carlough, Wappingers Falls, NY (US); Christopher A. Krygowski, Lagrangeville, NY (US); Brian R. Prasky, Wappingers Falls, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 13/354,894

(22) Filed: Jan. 20, 2012

(65) Prior Publication Data

US 2013/0191599 A1 Jul. 25, 2013

(51) Int. Cl.
*G06F 12/12* (2006.01)

(52) U.S. Cl.
USPC .................................. 711/136; 711/E12.071

(58) Field of Classification Search
USPC ................................................ 711/136, 130
See application file for complete search history.

(56) References Cited

U.S. PATENT DOCUMENTS

| 6,327,644 | B1 | 12/2001 | Beardsley et al. | |
|---|---|---|---|---|
| 7,318,127 | B2 | 1/2008 | Hrusecky et al. | |
| 7,603,522 | B1 * | 10/2009 | Lepak et al. | 711/130 |
| 2003/0208665 | A1 * | 11/2003 | Peir et al. | 711/169 |
| 2008/0065834 | A1 | 3/2008 | Check et al. | |
| 2008/0082754 | A1 | 4/2008 | Bell et al. | |
| 2010/0174867 | A1 * | 7/2010 | Gill et al. | 711/118 |
| 2010/0191916 | A1 | 7/2010 | Balakrishnan et al. | |
| 2011/0072218 | A1 | 3/2011 | Manne et al. | |
| 2011/0161589 | A1 * | 6/2011 | Guthrie et al. | 711/122 |
| 2011/0307664 | A1 * | 12/2011 | Paver et al. | 711/128 |

OTHER PUBLICATIONS

Gu, Xiaoming and Ding, Chen "On the Theory and Potential of LRU-MRU Collaborative Cache Management", Department of Computer Science, University of Rochester, Rochester, New York, USA. {xiaoming, cding} @cs.rochester.edu.*
International Application No. GB13003053.8; International Search Report and Written Opinion dated Aug. 7, 2013; 10 pages.
S. Kahn, et al., "Insertion Policy Selection Using Decision Tree Analysis," 2010 IEEE; pp. 106-111.
M. Qureshi, et al., "Utility-Based Cache Partitioning: A Low-Overhead, High-Performance, Runtime Mechanism to Partition Shared Caches," The 39th Annual IEEE/ACM International Symposium on Microarchitecture (MICRO'06); 2006 IEEE; pp. 1-10.
JH Chang, et al., "Fast Cache Access Based on Most Recently Used Hits," ip.com ; ip.com No. IPCOM000057017D; Mar. 1, 1988; 4 pages.

(Continued)

*Primary Examiner* — Matthew Bradley
*Assistant Examiner* — Zubair Ahmed
(74) *Attorney, Agent, or Firm* — Cantor Colburn LLP; Margaret McNamara

(57) ABSTRACT

A technique is provided for cache management of a cache. The processing circuit determines a miss count and a hit position field during a previous execution of an instruction requesting that a data element be stored in a cache. The miss count and the hit position field are stored for a data element corresponding to an instruction that requests storage of the data element. The processing circuit places the data element in a hierarchical order based on the miss count and/or the hit position field. The hit position field includes a hierarchical position related to the data element in the cache.

20 Claims, 8 Drawing Sheets

(56) References Cited

OTHER PUBLICATIONS

JA Pershing, et al., "Improving Most Recently User Change Prefetching," IBM Technical Disclosure Bulletin; vol. 36, No. 8; ip.com No. IPCOM000105598D; Aug. 1, 1993; pp. 437-442.

M. Qureshi, et al., "Adaptive Insertion Policies for High Performance Caching," ISCA '07, Jun. 9-13, 2007, San Diego, California, USA; pp. 381-391.

J. Reineke, et al., "Relative Competitiveness of Cache Replacement Policies," Sigmetrics '08, Jun. 2-6, 2008, Annapolis, Maryland USA; pp. 431-432.

J. Wu, et al., "Cache Management with Partitioning-Aware Eviction and Thread-Aware Insertion/Promotion Policy," IEEE Computer Society 2010; International Symposium on Paralell and Distributed Processing with Applicaitons; pp. 374-381.

* cited by examiner

Determine a miss count and a hit position field during a previous processing of an instruction requesting a data element be retained in a cache  605

↓

Place the data element in a hierarchical order based on at least one of the miss count and the hit position field during a subsequent processing of the instruction  610

↓

Responsive to the miss count not being set, place the data element in the hierarchical position as a function to the hierarchical position stored in the hit position field  615

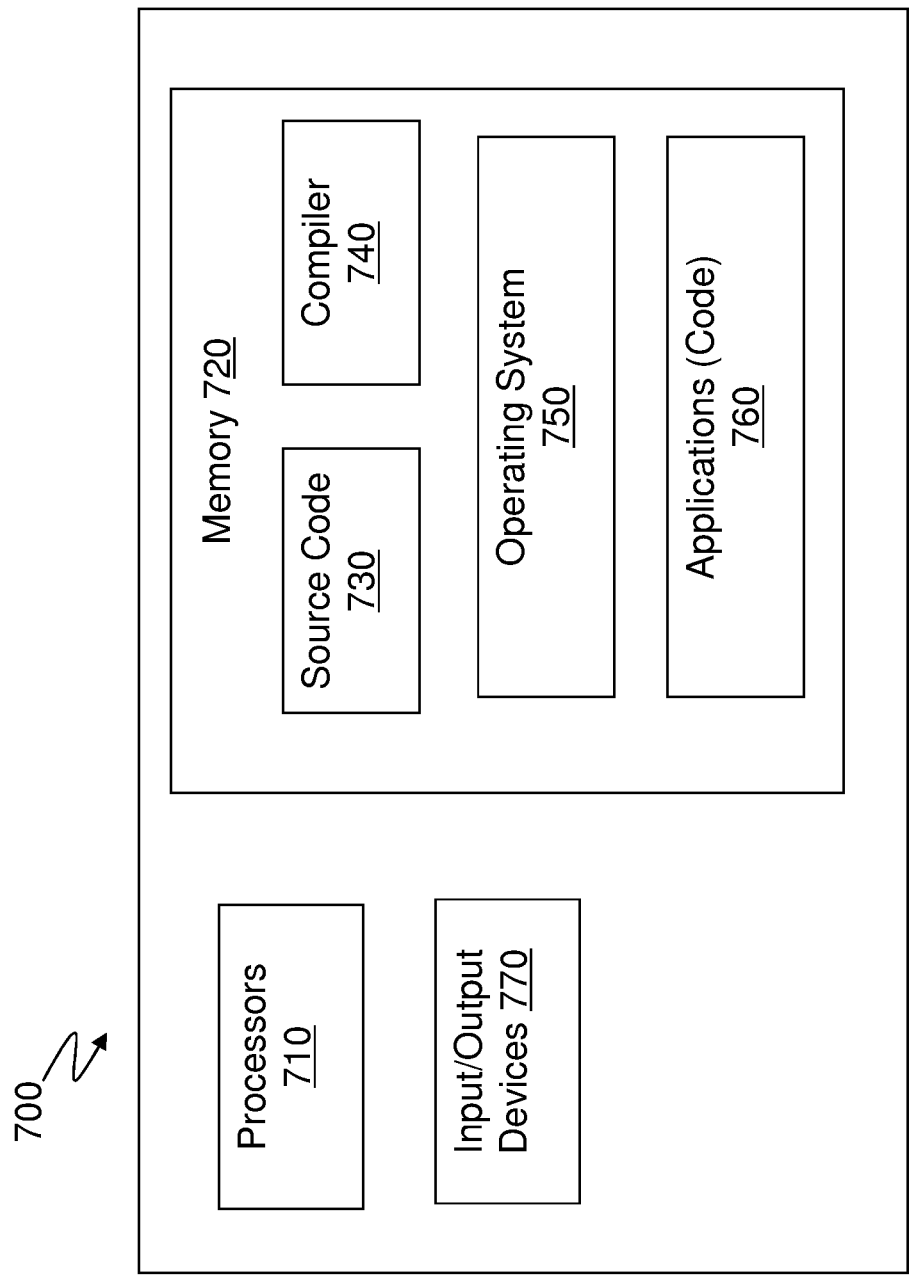

CACHE SET REPLACEMENT ORDER BASED ON TEMPORAL SET RECORDING

BACKGROUND

The present invention relates to data processing, and more specifically, to the cache set replacement order of data elements in a set-associative cache based on temporal recording information.

A cache is a component that transparently retains data elements (or simply data) so that future requests for any retained data can be served faster. A data element that is stored within a cache corresponds to a pre-defined storage location within a computer system. Such data element might be a value that has recently been computed or a duplicate copy of the same storage location that are also stored elsewhere. If requested data is contained in the cache, this is a cache hit, and this request can be served by simply reading the cache, which is comparatively faster since the cache is usually built close to its requester. Otherwise, if the data is not contained in the cache, this is a cache miss, and the data has to be fetched from other storage medium not necessarily close to the requester, and thus is comparatively slower. In general, the greater the number of requests that can be served from the cache, the faster the overall system performance becomes.

SUMMARY

According to exemplary embodiments, a computer system, method, and computer program product are provided for determining a cache set replacement order of data elements in a set-associative cache based on temporal set recording information. A miss count and a hit position field of an instruction that requests storage of a data element in a cache are determined. The miss count and the hit position field are generated based upon previous executions of the instruction. During a cache miss, the data element requested is then placed (installed) into a cache set location using a hierarchical positioning scheme based on at least one of the miss count and the hit position field. During a cache hit, the data element's set replacement order is modified accordingly to the (same) miss count and hit position field. The hit position field defines a hierarchical position related to the data element within a cache congruence class.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 6 illustrates a method for cache management of a cache by circuits according to an embodiment of the present invention;

FIG. 7 illustrates an example of a computer having capabilities, which may be utilized in accordance with embodiments of the present invention;

DETAILED DESCRIPTION

Figure 1:
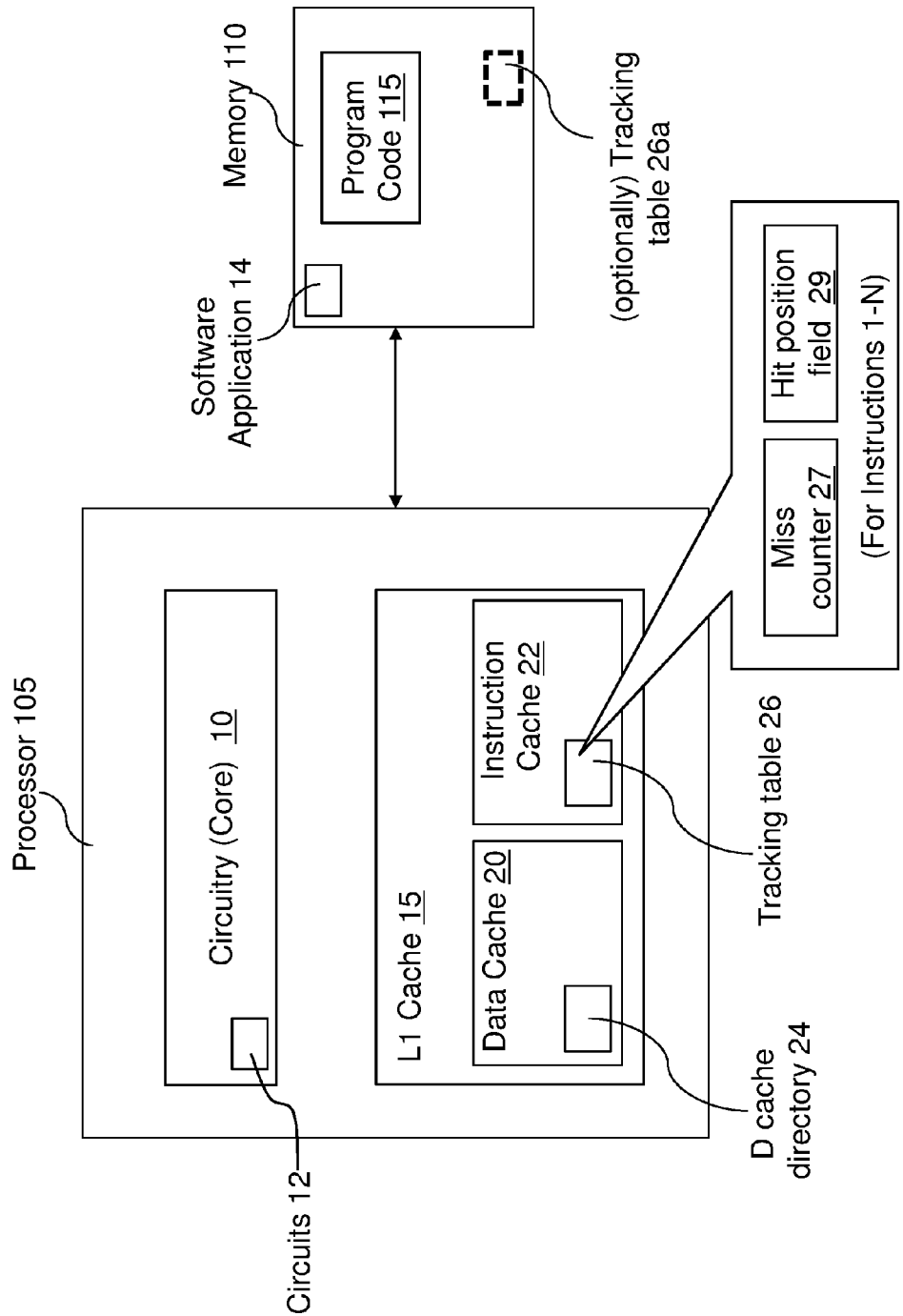
FIG. 1 illustrates a block diagram of a system according to an embodiment of the present invention.

A microprocessor may contain a level one (L1) data cache (D-cache). The L1 data cache is used for keeping data elements of a subset of the system memory locations such that instructions doing loads and stores can be processed closest to the processor core. Upon a cache miss, data elements corresponding to a requested storage location is installed into the cache. Each entry in the cache represents a cache line which corresponds to a portion of storage. One such typical install algorithm for a cache is based on least recently used (LRU). As an example, a data cache may contain 1024 rows which are called congruence classes, and the data cache may be a 4-way set associative cache, which would have a total of 4k entries. For each congruence class, an ordering of most recently used set to least recently used set may be tracked as a set of hierarchical positions used for replacements. Upon installing a new entry into the data cache for a given congruence class among one of the 4 sets, the LRU entry is chosen to be replaced.

A simultaneous multithreaded (SMT) processor allows multiple threads to run in parallel on a single processor core. While the LRU scheme can remain in use for the D-cache, SMT capability introduces new resource sharing issues, which can lead to sub-optimal performance. For example, one thread can be streaming through a large data-space, which trashes a cache level (such as the L1 cache), while another thread can make good use of the cache because it is accessing mostly a small amount of data. The streaming process inhibits the other thread through its continual cache thrashing. In other words, for optimal performance, each thread should not take up more of the cache than it can effectively utilize in comparison to the other threads which also use the cache.

Association can be made about data accessing instructions that never encounter cache misses and their corresponding instruction addresses. Such an example is a register spill and fill. A given instruction (e.g. store) updates or installs the cache with a general purpose register content, and a subsequent instruction (e.g. load) accesses the content that was stored in the cache. The load being close to the store never misses the cache. Associations can also be made about cache accesses of instructions which always miss. In other words, always hit or miss can be correlated to an instruction address for future predicted behavior. However, any instruction with data cache accesses which are a combination of hits and misses can not readily be associated to only its instruction address with respect to predicting its future behavior.

Through marking instructions which always hit or miss the data cache, these installs (upon a miss) into the D-cache and accesses (loads/stores) from the D-cache can be made as to not be set as MRU (most recently used) position (state) and/or close to MRU position (state) in the D-cache directory according to an exemplary embodiment. In this manner (for example), the processor can prevent a thread from fully trashing another thread's cache of data in the D-cache. A thread that trashes the cache has accesses which always miss the cache. Such misses should not be installed as MRU position as otherwise the data would have to work its way out of the cache by eventually reaching the LRU position to subsequently be evicted. If such data is initially installed as LRU and remains LRU (if installed at all), then this data in the LRU position will be limited in nature as to the amount of cache pollution it yields according to an exemplary embodiment. If a given load (or a store) access for example always hits in the cache, then marking the hit set as MRU may be unnecessary when marking the hit set in a position closer to LRU position would also result in a cache hit. By marking the data element too close to the MRU position, once the data (i.e., data element) is no longer needed, the data resides in the data cache for a longer period than needed. By maintaining an always hit data element in a position closer to LRU as determined according to exemplary embodiments, this allows another data element which needs to be saved away for a longer time in the cache before being re-accessed to remain in the cache. This is such, for when an entry is marked as MRU, the prior MRU entry will be moved to second ($2^{nd}$) MRU position. The second MRU entry is now one slot closer to the LRU position, and the LRU position is the entry that will get evicted when a new entry is installed into the given congruence class of the cache. Exemplary embodiments are configured to determine which position (e.g., from MRU position through LRU position, and/or no install at all) an entry should be placed into when installing and/or updating an entry in the data cache. This technique can be expanded to working in the instruction cache and/or other caching structures in a microprocessor.

Turning now to FIG. 1, a block diagram of a system 100 is generally shown according to an embodiment. The system 100 includes a processor 105. The processor 105 has one or more processor cores, and the processor core may be referred to as circuitry 10. The processor 105 may include a level one (L1) cache 15. Although an L1 cache is shown, exemplary embodiments may be implemented in an L1 cache and L2 cache as desired. The L1 cache 15 includes an L1 data cache 20 (D-cache) and an L1 instruction cache 22 (I cache). The data cache 20 is on-processor (hardware) memory for caching (i.e., retaining) data on the processor 105. Data retrieved from memory 110 may be cached in the data cache 20 while instructions of program code 115 retrieved from the memory 110 may be cached in the instruction cache 22 (e.g., on-processor (hardware) memory).

Figure 2:
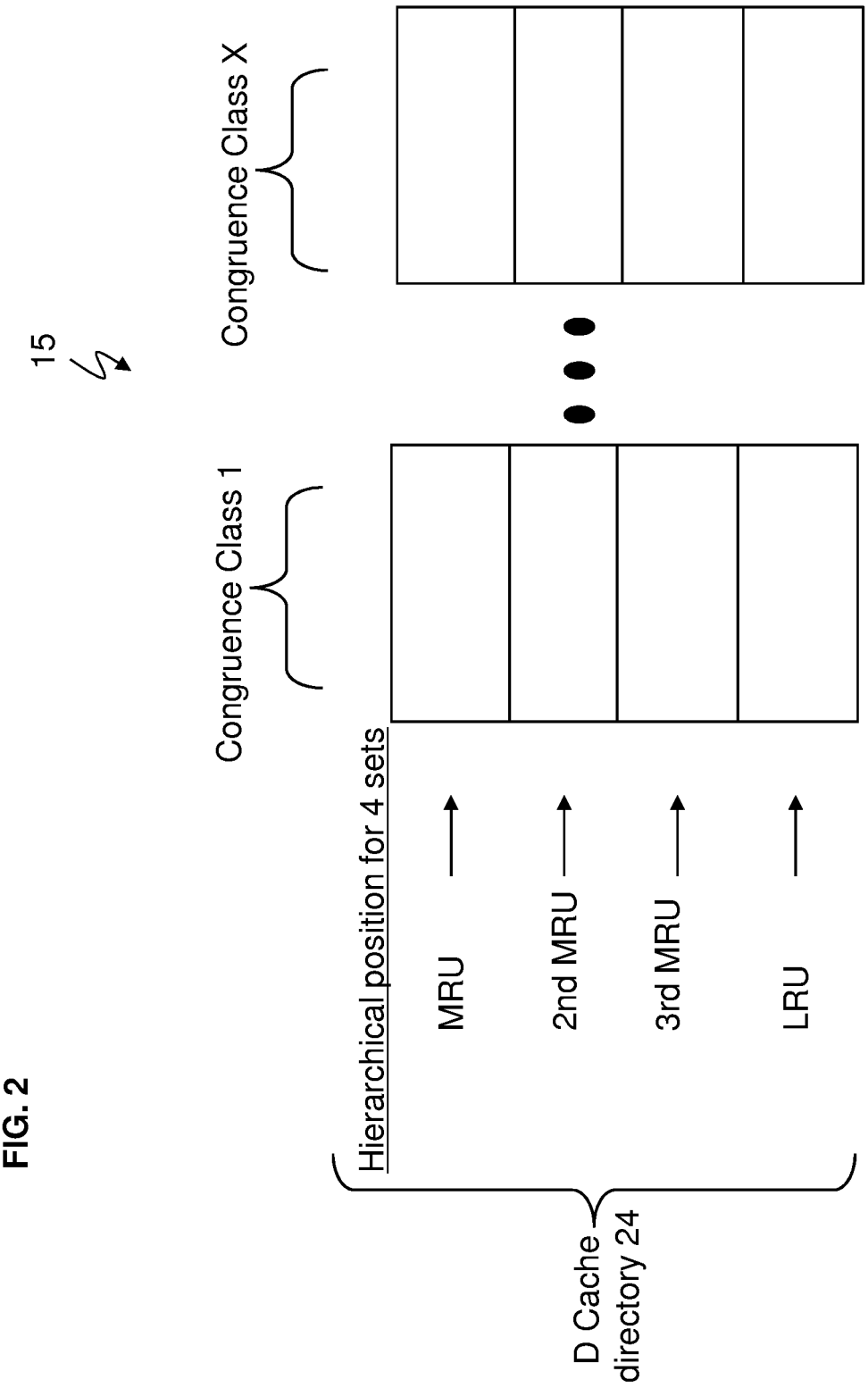
FIG. 2 illustrates a block diagram of hierarchical positions stored in a cache directory for cached data elements per congruence class according to an embodiment of the present invention.

The L1 cache 15 may be an N-way set associative cache, with X congruence classes as understood by one skilled in the art. The D-cache 20 includes a D-cache directory 24 that may contain the LRU replacement order (respective hierarchical positions) for each entry (data element) of the congruence classes. Per congruence class, the replacement ordering of the data elements in an individual congruence class can range from MRU position, second MRU position, third MRU position, to LRU position as shown in FIG. 2. The MRU position is the highest position for a data element (an entry) in the D-cache 20, second MRU position is the second highest, third MRU position is the third highest, and LRU position is the lowest position for a data element (assuming a 4 way set associative cache). A data element (entry) is/denotes cached data in the D-cache 20 of the L1 cache 15.

Figure 3:
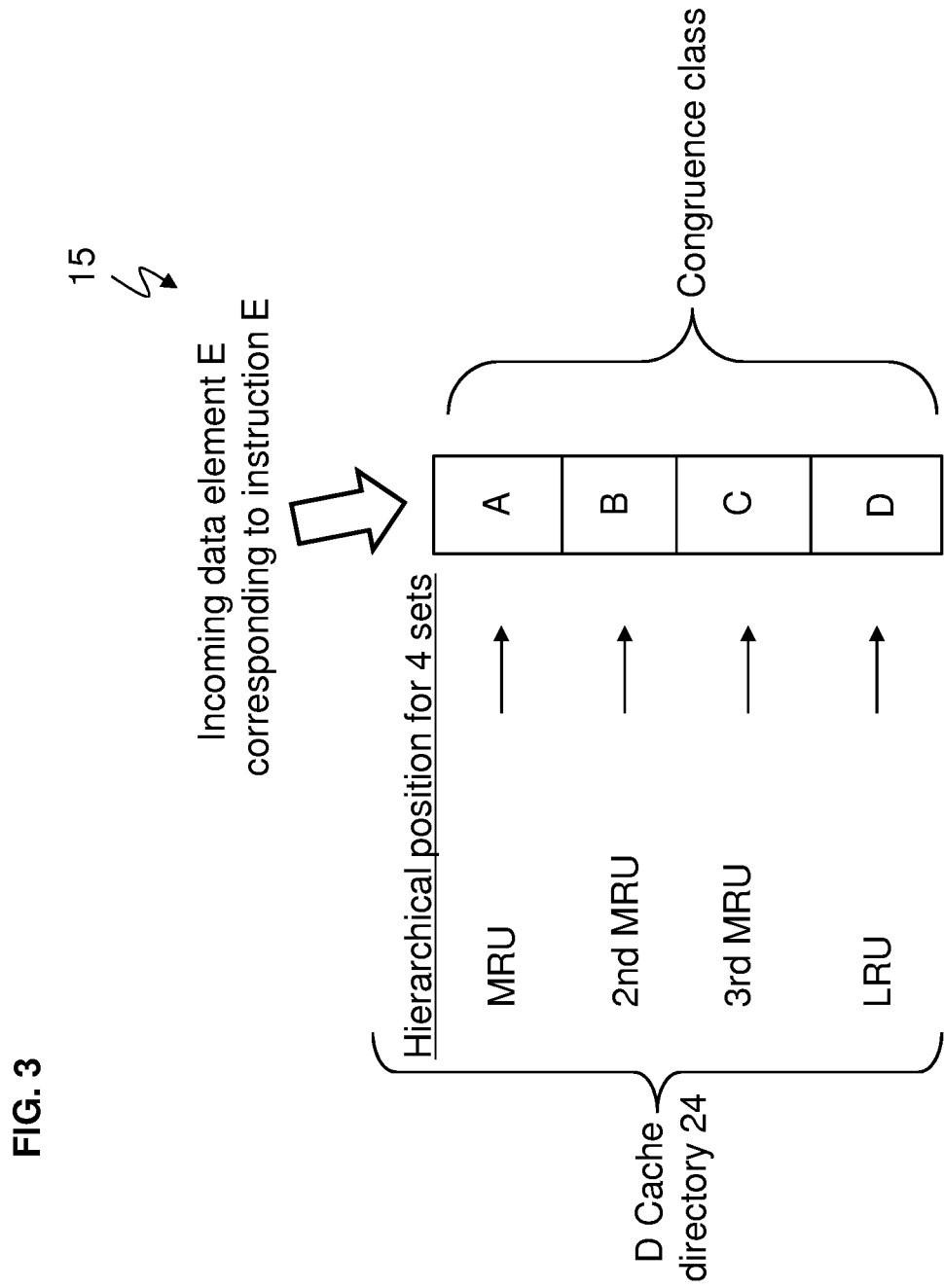
FIG. 3 illustrates a block diagram of data elements cached in a cache according to the hierarchical positions for a congruence class according to an embodiment of the present invention.

FIG. 2 illustrates an example of the replacement ordering (e.g., 4 hierarchical positions) per set stored in the D-cache directory 24 for cached data elements per congruence class in the D-cache 20 according to an embodiment. In FIG. 2, there is congruence class 1 through congruence class X (which would be equivalent to congruence class 0 through X−1 as understood by one skilled in the art), and 4 sets are shown in each congruence class for explanation purposes. Assume, for example, that data elements A, B, C, and D are entries cached in each set of the D-cache 20 according to the hierarchical positions shown in FIG. 3 for congruence class 1. Normally, if a new data element E was installed into congruence class 1 of D-cache 20, this incoming data element E would be made the MRU position and data element D would be evicted out of the LRU position in the D-cache. Subsequently, each data element would move down one position in the hierarchical ordering, such that the new hierarchical ordering is E, A, B, and C respectively from MRU position to LRU position.

However, the (hardware) circuits 12 of the circuitry 10 are designed to install any data element (such as the incoming data element E) in a hierarchical position according to a tracking table 26 located in the I cache 22. The circuits 12 are configured to determine the hierarchical position to install (and/or not to install) an incoming data element based on past history of the associated instruction (e.g. a fetch instruction) that calls for that particular data element, such that when that particular instruction from the program code 115 is executed (i.e., seen) again by the processor circuitry 10 of the processor core, the circuits 12 install the corresponding data element according to a function of the stored position in the tracking table 26. The corresponding instruction address is maintained (tagged) in the tracking table 26 of the I cache 22 along with the directions for handling its corresponding data element as further discussed herein.

The circuits 12 may be application specific integrated circuits (ASIC), field programmable gate arrays (FPGA), etc. Also, the logic of the circuits 12 may be implemented as software code illustrated as software application 14 in one implementation. Any reference to the functions, logic, and features for the circuits 12 applies to the software application 14 as understood by one skilled in the art. Tracking table 26 may alternatively and/or additionally be stored in the memory 110 as tracking table 26a, and any reference to the functions, logic, and features of the tracking table 26 applies to tracking table 26a as understood by one skilled in the art.

As controlled by the circuits 12, the tracking table 26 is configured to keep track of data elements stored in the D-cache 20 as an association to the instruction performing the data access, and when the instruction is subsequently processed by the circuitry 10, its corresponding data element will be placed in a hierarchical position in the D-cache directory 24 as a function of the miss counter 27 and hit position field 29 previously stored for that particular instruction. The circuits 12 utilize the tracking table 26 to track the instruction address of each instruction (e.g., from the program code 115 and/or any other program) that accesses a data element in the D-cache 20.

For example, it is assumed that data element E has an associated instruction address E (or simply instruction E). Upon the first time data element E is cached in the D-cache 20 (and instruction E is cached in the I cache 22), the circuits 12 are configured to track the instruction E and data element E in the tracking table 26. On this first round, the data element E is ordered in the MRU position of the D-cache directory 24 (as normally). The miss counter 27 corresponding to data accesses by instruction E starts at zero (0), and, e.g., saturates/ends at three (3), where 3 is the threshold miss count in this example. Any cache miss over 3 exceeds the threshold as discussed herein. For every cache miss to the D-cache 20 for data access by instruction E, the miss counter 27 increments by one (1) until the miss counter reaches 3. At this point, the miss counter 27 no longer increments by 1 any further. When there is a cache hit to the D-cache 20, the circuits 12 decrement the miss counter 27 by 1 until reaching 0, and does not decrement below 0. If other incoming data elements are stored in the same congruence class of the D-cache 20 subsequent to storing data accessed by instruction E, the data element in the LRU position will be evicted out of the D-cache 20 and the remaining data elements will move down a slot in the hierarchical positions.

Normally, for each cache hit to (a data element E in) the D-cache 20, data element E will be moved into the MRU position (if the data element E has previously moved down the hierarchy), but the data element E can move no higher than the MRU position.

In first scenario of initially processing the instruction E by the circuitry 10, assume that the miss counter 27 reaches its maximum value, e.g., threshold 3. When the circuits 12 determine that the miss counter 27 reaches its maximum value 3, the miss counter 27 does not increment beyond its maximum value 3 but instead saturates at 3. In response to the cache miss for the data accessed by instruction E (reaching the maximum value 3), the circuits 12 are configured to recognize that instruction E is to have its corresponding data elements (always) installed and maintained in the LRU position for subsequent processing of the instruction E (based on the miss counter 27 reaching 3 for instruction E). Subsequent processing of the instruction E refers to processing the instruction E at a later time in which the instruction E accesses a data element E to again be cached in the D-cache 20. Maintaining the data element E in the LRU position means that the circuits 12 are configured to determine and maintain a tag (in the tracking table 26 for instruction E) that the data element E accessed by instruction E is to subsequently be placed in the LRU position (when processing instruction E at a later time) and not move up to the MRU position of the D-cache directory 24 even when cache hits occur for data element E. Unlike typical cache management, the data element E for instruction E is locked from moving up any hierarchical positions (even for a cache hit) by the circuits 12 until the data element E is eventually evicted out of the D-cache 20 by an incoming data element. Optionally, in such a case when the miss counter 27 saturates (exceeds its threshold), the circuits 12 may be configured to not install the data element E in the D-cache 20 at all for instruction E. Note that as discussed herein, the cache management is based on the miss counter 27 and hit position field 29 stored in tracking table 26 for each previously processed instruction (such as instruction E discussed in the various scenarios).

In a second scenario of accessing a data element E by instruction E, the miss counter 27 has not reached its maximum value (e.g., the miss counter 27 is not set) and the data element E can be eventually evicted out of the D-cache 20. The circuits 12 are configured to tag/mark (e.g., set appropriate bits) in the hit position field 29 (corresponding to instruction E) the closest hierarchical position to the LRU position (including the LRU position itself) in which the data element E had a cache hit before being evicted out. Four example cases are provided below.

In a first case, when the lowest cache hit hierarchical position for data element E in the D-cache 20 occurred in the MRU position, the circuits 12 will store/mark the MRU position in the hit position field 29 for instruction E. When circuits 12 again process the instruction E at a later time, the circuits 12 will check the hit position field 29 for instruction E. If the marking in the hit position field 29 is MRU position, then the new entry (the same or a different data element E) is to be installed upon a cache miss by the circuits 12 into the LRU position upon subsequent processing of the instruction E, as the data element E (only) needs one set in the D-cache 20. Assume that a cache hit occurs for the data element E in the D-cache 20. Normally, on a cache hit without this disclosed feature, the data element E would be made the MRU position. However, with this disclosed feature, on a cache hit, the data element E is made as close to MRU position as allowed as per the hit position field 29, and in the above case, the data element E is made LRU position on a cache hit. The entry will never be moved higher than the (original) install hierarchical position according to the hit hierarchical position field 29 for instruction E. This prevents the L1 cache 15 from being polluted by having to wait a longer time than needed for the data element E to be evicted out of the L1 cache.

In a second case, when the lowest cache hit hierarchical position for a data element E in the D-cache 20 occurred in the $2^{nd}$ MRU position of a 4-way set associative cache, the circuits 12 will store/mark the $2^{nd}$ MRU position in the hit position field 29 for instruction E. When circuits 12 again process the instruction E at a later time, the circuits 12 will check the hit position field 29 for instruction E. If the marking in the hit position field 29 is $2^{nd}$ MRU position, then new entry (the same or a different date element E) is to be installed upon a cache miss by circuits 12 into the $3^{rd}$ MRU (aka $2^{nd}$ LRU) position, as the entry (only ever) needs two sets. Assume that a cache hit occurs for the data element E in the D-cache 20. Normally, on a cache hit the data element E would be made the MRU position. However, on a cache hit, the data element E is made as close to MRU position as allowed as per the hit position field 29, and in the above case, the data element E is made the $3^{rd}$ MRU position on a cache hit (by the circuits 12).

In a third case, when the lowest cache hit hierarchical position for a data element E in the D-cache 20 occurred in the $3^{rd}$ MRU position (there may be previous cache hits in the MRU and $2^{nd}$ MRU positions), the circuits 12 will store/mark the $3^{rd}$ MRU position in the hit position field 29 for instruction E. When circuits 12 again process the instruction E at a later time, the circuits 12 will check the hit position field 29 for instruction E. If the marking in the hit position field 29 is $3^{rd}$ MRU position, then the new entry (the same or a different data element E) is to be installed upon a cache miss by the circuits 12 into the $2^{nd}$ MRU position, as the entry needs three sets. Assume that a cache hit occurs for the data element E in the D-cache 20. Normally, on a cache hit the data element E would be made the MRU position. However, on a cache hit, the data element E is made as close to MRU position as allowed as per the hit position field 29, and in the above case, the data element E is made the $2^{nd}$ MRU position on a cache hit.

In a fourth case, when the lowest cache hit hierarchical position for a data element E in the D-cache 20 occurred in the LRU position (there may be additional cache hits in higher positions on other accesses), the circuits 12 will store/mark the LRU position in the hit position field 29 for instruction E. When circuits 12 again process the instruction E at a later time, the circuits 12 will check the hit position field 29 for instruction E. If the marking in the hit position field 29 is LRU position, the entry is to be installed by the circuits 12 into the MRU position, as the new entry (the same or a different date element E) makes use of all 4 sets in the D-cache. Assume that a cache hit occurs for the data element E in the D-cache 20.

For the cache hit, the data element E is made as close to MRU position as allowed as per the hit position field 29, and in the above case, the data element E is made the MRU position on a cache hit.

For the hit position field 29, once the data element reaches the marked position (determined when initially processing of the instruction) at which the lowest cache hit hierarchical position occurred, the circuits 12 count the marked position (itself) back through MRU position. The number counted (X) is how many sets (hierarchical positions) needed by this particular data element. To find the install hierarchical position, this number (X) is utilized (by the circuits 12) to count from the LRU position (itself as 1 set) up through the MRU position, and the hierarchical position at which the counting stops (number X) is the install position for the data element. There is an inverted relationship between marked position in the hit hierarchical position field 29 and the install hierarchical position.

To further explain the difference between miss counter 27 action and hit position field 29 action, the circuits 12 are configured to operate the D-cache 20 such that the miss counter 27 takes precedence over the hit position field 29. When initially processing instruction E, assume that the miss counter 27 reaches the threshold (for instruction E), and assume that the lowest cache hit position for data element E is marked in the hit position field 29 (e.g., MRU position, $2^{nd}$ MRU position, $3^{rd}$ MRU position, or LRU position). Upon subsequent processing of the instruction E, the circuits 12 are configured to determine (by checking the tracking table 26 for the tag/bits corresponding to instruction E) that both the miss counter 27 is at threshold and the hit position field 29 is set. The circuits 12 are configured to determine that the miss counter 27 action overrides the hit position field 29 action, such that the action (i.e., install and remain in the LRU position until evicted out of the D-cache 20 of any data element accessed by instruction E, or do not install in the D-cache 20) corresponding to the miss counter 27 is applied but not the action corresponding to the hit position field 29.

Although a single miss counter 27 and hit position field 29 are shown in FIG. 1, the miss counter 27 and hit position field 29 represent a plurality of miss counters 27 and hit position fields 29 which both correspond to individual instructions (instruction addresses of data accessing instructions) of, e.g., the program code 115 and/or other executable program code. Although the tracking table 26 is shown in the I cache 22, the tracking table 26 can be maintained anywhere else (per processor) as understood by one skilled in the art. Further, the tracking table 26 can be maintained and constructed in various ways as understood by one skilled in the art, which includes keeping the instruction address as a function of a pre-defined hash, maintaining the tracking table as a set-associative lookup table, etc.

Also, note that each instruction processed by the circuits 12 is tagged/stored to have its own respective miss counter 27 and hit position field 29 in the tracking table 26. In this regard, the circuits 12 can later check the tracking table 26 for an instruction hit or miss for each respective instruction in the I cache 22, and when there is an instruction hit, the respective data element for that instruction is processed based on the miss counter 27 (if the threshold is met) and the hit position field 29 (which could be empty if there were no cache hits). Each previously processed instruction is tied to its own miss counter 27 and hit position field 29 to be applied on subsequent occasions of processing that instruction.

In one implementation, the miss counter 27 may be two bits (or more if desired) and the hit position field 29 may be two bits. The bits of the miss counter 27 can be set to count the D-cache misses encountered for the corresponding instruction. The circuits 12 are configured to recognize when the miss count threshold has been reached for each of the instructions. When the miss count threshold of the miss counter 27 has not been reached for the instruction, no corresponding action will be taken by the circuits 12 related to the miss counter 27 upon subsequent processing of the instruction. When the miss count has reached the miss count threshold, the circuits 12 will recognize this and take appropriate miss counter 27 actions (e.g., maintain data element in LRU position and/or not install the data element) as discussed herein. Also, the bits of the hit position field 29 can be set to represent each hierarchical order (from MRU position through LRU position) in the D-cache directory 24, and the particular hierarchical order is stored according to the hit position field for respective instructions. According to the discussions herein, it is understood that various techniques can be utilized to represent features and functions of the miss counter 27 and the hit position field 29 as understood by one skilled in the art.

Various example scenarios are utilized referencing instruction E and its data element E for explanation purposes and not limitation. The circuits 12 are configured to concurrently or near concurrently process as discussed herein numerous instructions and their respective data elements according to the present disclosure.

The processor 105 may be a simultaneous multithreaded (SMT) processor that allows multiple threads to run in parallel on a single processor core (e.g., circuitry 10). When tracking (by the circuits 12) which hierarchical position closest to the LRU position a given instruction access encounters, the instruction may be tracked as all threads maintaining a single hierarchical order or the tracking may be performed on a per thread basis. While utilizing more area, the benefit of tracking per thread is to acquire the knowledge of how many sets are required for the given thread, thus minimizing learning interference from the other threads. For example, with reference to FIG. 3, assume that thread 1 has data elements A and B and thread 2 has data element C and D. Instead of looking at the set as a whole, the circuits 12 can be configured to only look at the hierarchical ordering relative to the positions per thread and then apply the miss counter 27 and hit position field 29 as discussed herein. For example, on a per thread basis, the circuits 12 are configured to consider the data element C as the MRU position and data element D as the $2^{nd}$ MRU position for thread 2 and then analogously apply the miss counter 27 and hit position field 29 for the thread 2 instruction. Likewise, the circuits 12 are configured to consider data element A in the MRU position and data element B in the second MRU, and then analogously apply the miss counter 27 and hit position field 29 for thread 1 instruction as discussed herein.

For example, in applying SMT and not modifying the algorithm, thread 1 may on this pass always hit as the MRU and $2^{nd}$ MRU positions (of all positions within the hierarchy of a particular congruence class). On a future pass of the code based on what thread 2 is doing, thread 1's data may not be available (installed as $3^{rd}$ MRU as it only ever used the first two slots initially) as one of the two most recent accessed entries in the given congruence class based on what thread 2 is doing/accessing.

On the first install (no information is in the tracking table 26), the entry gets installed into the D-cache 20 and made MRU as has been described above. The calculation of the worst position (closest to LRU position) is tracked differently. If this was the only entry from this thread in the given congruence class (e.g., all other entries are from another thread), then this entry could be considered both MRU and LRU (only one entry in the thread so one slot allocated and hence MRU=LRU). It would then be denoted as hitting in the LRU slot (for the given thread) such that on future installs it would be installed into the MRU slot (of the entire congruence class). If there are two entries for this thread (call the two entries A and B), and 'A' was always MRU between entries 'A' and 'B', then 'A' is MRU and 'B's worst access position is the LRU slot (with respect to this thread's ordering). As such, 'A' is one slot away from LRU (of this thread's ordering). Entry 'A' (for this thread) will therefore be tracked as "$3^{rd}$ MRU" in the tracking table 26 (which is one slot away from LRU of the overall congruence class), such that on future installs 'A' will be installed into the $2^{nd}$ MRU position. This provides safety from the other thread, because the other thread could push this thread's entry 'A' two slots closer to LRU, and 'A' would remain in the D-cache as the LRU position of the hierarchy.

Figure 4:
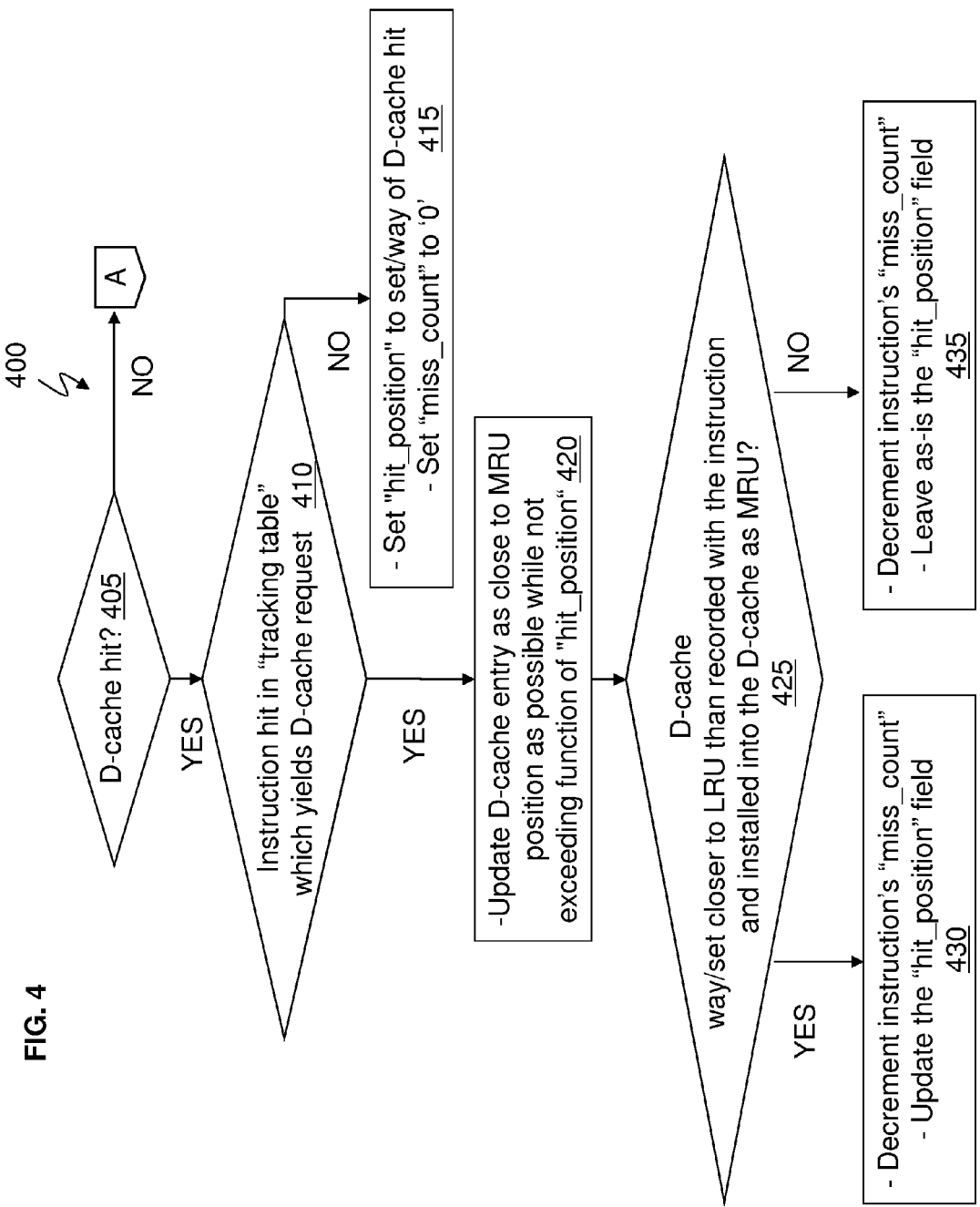
FIG. 4 illustrates a flow chart updating a hit position field and miss counter according to an embodiment of the present invention.

Now turning to FIG. 4, a flow chart 400 is illustrated for updating the hit position field 29 and the miss counter 27 according to an exemplary embodiment. Also, the flow chart 400 illustrates how the D-cache 20 behaves with respect to when the hit position field 29 is applied.

Assume that instruction E requesting data element E is processed by the circuitry 10 of the processor 105 to request the data element E. The circuits 12 of the processor 105 determine whether there is a D-cache hit for data element E in the D-cache 20 at block 405. If no, there is not a D-cache hit for the data element E, the flow proceeds off page to block 505 in FIG. 5. If yes, there is a D-cache hit for the data element E, the circuits 12 determine whether there is an instruction hit in the tracking table 26 of the I cache 22 which yields (makes) the D-cache request at block 410. If no, there is no instruction hit in the tracking table 26 of I cache 22 (i.e., no miss counter 27 and/or hit position field 29 tagged for this particular instruction (e.g., instruction E)), the circuits 12 are configured to set the hit position field 29 to accord with the hierarchical position (e.g., MRU position through LRU position) at the time of the D-cache hit and to set the miss counter 27 to 0 at block 415. Having no instruction hit in the tracking table 26 means that this particular instruction (e.g., instruction E) has not been previously processed to have a miss counter 27 and hit position field 29, or that the particular instruction (e.g., instruction E) has been removed from the tracking table 26.

If yes, there is an instruction hit in the tracking table 26 for this particular instruction (e.g., instruction E), the circuits 12 are configured to make/place the D-cache entry, data element E, as close to the MRU position as possible without exceeding the function of the hit position field 29 at block 420. For example, if the hit position field 29 is set to $2^{nd}$ MRU position for instruction E, the circuits 12 are configured to make/place the corresponding data element E (fetched by the instruction address of instruction E) to the $3^{rd}$ MRU position in the D-cache directory 24 of the D-cache 20 (as discussed above).

The circuits 12 are configured to check whether the corresponding data element (e.g., data element E), when installed as MRU position, is set closer to the LRU position than what was recorded in the tracking table 26 for the corresponding instruction (e.g., instruction E) at block 425. If yes, the circuits 12 are configured to decrement the instruction's miss count in the miss counter 27 and update the hit position field 29 to the current hierarchical position at block 430. For example, if initially installed as MRU position and later referenced/marked as low as 2nd MRU position, then on a future install of data element E accessed by instruction E, data element E will get installed as the 3rd MRU (also known as 2nd LRU) slot. If no, the circuits 12 are configured to decrement the instruction's miss count in the miss counter 27 and allow the hit position field 29 to remain as is for the instruction (e.g., instruction E) at block 435.

Figure 5:
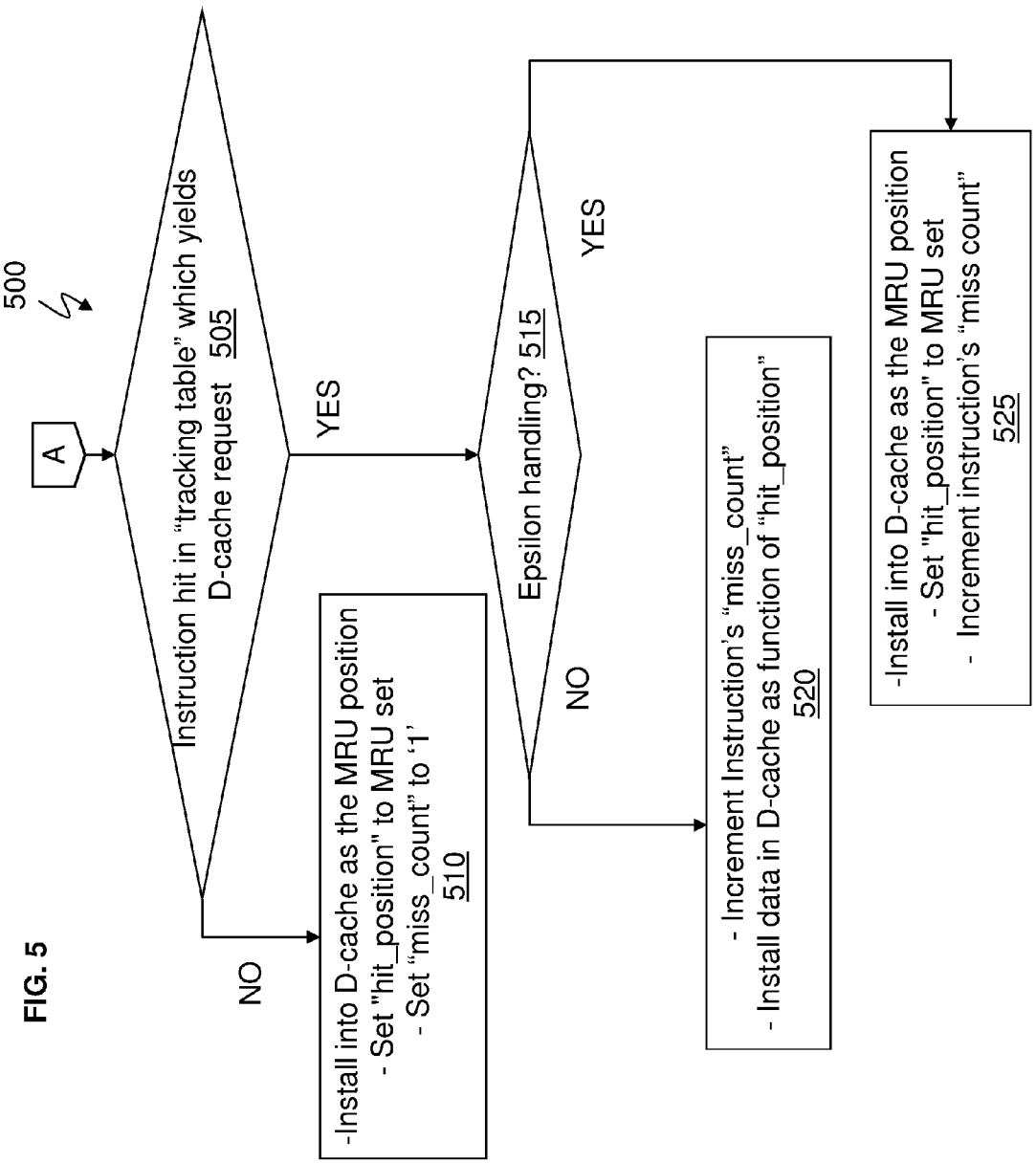
FIG. 5 illustrates a flow chart continuing to update a hit position field and miss counter according to an embodiment of the present invention.

Now turning to FIG. 5, a flow chart 500 is illustrated which continues the flow chart 400 in FIG. 4 according to an embodiment. At block 505, if there is a D-cache miss (i.e., there was not a D-cache hit at block 405), the circuits 12 are configured to determine if there is an instruction hit for instruction E in the tracking table 26 of the I cache 22 which yields (makes) the D-cache request. If no, there is not an instruction hit for the instruction E making the D-cache request, the circuits 12 are configured to install this particular instruction (e.g., instruction E) into the tracking table 26, by setting the hit position to MRU position, and setting the miss count of the miss counter 27 to 1 for this instruction E at block 510.

If yes, there is an instruction hit in the tracking table 26 for instruction E, the circuits 12 are configured to check whether epsilon handling should occur for the instruction E at block 515. If answer to block 515 is no, there is no epsilon handling for the instruction, the circuits 12 are configured to increment the instruction's miss count in the miss counter 27 and install the corresponding data element (e.g., data element E) in the D-cache 20 as a function of the hit position in the hit position field 29 at block 520.

To allow for process variability, there is an epsilon factor for epsilon handling. The epsilon defines a small percentage of the time where the install space descriptor (miss counter 27 and hit position field 29) stored in the tracking table 26 is ignored and the given entry is installed into the MRU position by the circuits 12. By allowing such an entry be installed into the MRU position, if the behavior of the program code 115 (having instruction E) has changed in time and a potential hit is being missed because of the install being too far away from MRU position, this will allow the circuits 12 of the processor 105 to correct/adjust for the new code behavior. As such, when answer to block 515 is yes, epsilon handling is initiated for this instruction (e.g., based on processing the instruction for a predetermined number of times and/or after a predetermined time period has elapsed), the circuits 12 are configured to install the corresponding data element (e.g., data element E) into the MRU position of the D-cache 20, set the hit position field 29 to MRU position, and increment the instruction's miss count in the miss counter 27 at block 525 (while ignoring the previous data/actions set for the miss counter 27 and hit position field 29).

FIG. 6 illustrates a method 600 for cache management of the D-cache 20 by the circuits 12 according to an embodiment. Note that although the circuits 12 have been identified as performing certain functions (e.g., wired with hardware components to execute as discussed herein) for explanatory purposes, the circuits 12 are part of the circuitry 10 (the hardware forming the processor core). Any discussion of the circuits 12 applies to the circuitry 10, both of which form the processor 105 (the processing circuit).

At block 605, the circuits 12 are configured to determine a miss count in the miss counter 27 and the hit position field 29 during a previous processing of an instruction (such as instruction E) requesting that a data element (e.g., data element E) be stored in a cache (e.g., the D-cache 20). The miss count of the miss counter 27 and the hit position field 29 are stored for the instruction requesting the data element. The miss counter 27 and/or the hit position field 29 may or may not be set while the other is set. Previous processing refers to an earlier time in which the instruction was processed by the circuits 12 to store/update the miss counter 27 data and/or hit position field 29 data in the tracking table 26 for the instruction.

The circuits 12 are configured to place/install the data element in a hierarchical order (of the D-cache directory 24)

based on at least one of the miss count (of the miss counter 27) and the hit position field 29 during a subsequent processing of the instruction. The hit position field 29 includes a hierarchical position related to the data element (e.g., data element E) residing within a congruence class in the cache (e.g., D-cache 20) at block 610.

Responsive to the miss count not being set, the circuits 12 are configured to install/place the data element in the hierarchical order according to the hierarchical position stored in the hit position field 29 at block 615. The circuits 12 place the data element in the hierarchical order according to an inverted relationship of the hierarchical position stored in the hit position field 29, and responsive to a cache hit, the circuits 12 prevent the data element from moving higher in the hierarchical order than the inverted relationship to the hierarchical position.

Further, responsive to a conflict between the miss count of the miss counter 27 and the hit position field 29, the circuits 12 are configured to process the instruction according to the miss count (e.g., bits set to indicate that the threshold was reached for the miss counter 27). Processing the instruction according to the miss count comprises placing the data element in the least recently used (LRU) position in the cache (when defined as the mode of operation) and/or not installing the data element in the cache (when defined as the mode of operation).

The hierarchical position in the hit position field 29 indicates a closest position to a least recently used (LRU) position in which a cache hit occurred for the data element during the previous processing of the instruction. The circuits 12 determine the miss count of the miss counter 27 and the hit position field 29 during the previous processing of the instruction requesting the data element stored in the cache by determining a lowest position in the hierarchical order for which the cache hit occurs for the data element in the D-cache 20; as such, the circuits 12 store the lowest hierarchical position determined for which the cache hit occurs as the hierarchical position in the hit position field 29 (e.g., set the corresponding bits).

The instruction fetch is made for an instruction address to acquire an instruction (e.g., instruction E). This instruction may trigger a data access (for data element E) to the D-cache 20.

FIG. 7 illustrates an example of a computer 700 having capabilities, which may be included in exemplary embodiments. Various methods, procedures, modules, flow diagrams, tools, application, circuits, elements, and techniques discussed herein may also incorporate and/or utilize the capabilities of the computer 700. Moreover, capabilities of the computer 700 may be utilized to implement features of exemplary embodiments discussed herein. One or more of the capabilities of the computer 700 may be utilized to implement, to connect to, and/or to support any element discussed herein (as understood by one skilled in the art) in FIGS. 1-6 and 8.

Generally, in terms of hardware architecture, the computer 700 may include one or more processors 710, computer readable storage memory 720, and one or more input and/or output (I/O) devices 770 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 is a hardware device for executing software that can be stored in the memory 720. The processor 710 can be virtually any custom made or commercially available processor, a central processing unit (CPU), a data signal processor (DSP), or an auxiliary processor among several processors associated with the computer 700, and the processor 710 may be a semiconductor based microprocessor (in the form of a microchip) or a macroprocessor.

The computer readable memory 720 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 720 may incorporate electronic, magnetic, optical, and/or other types of storage media. Note that the memory 720 can have a distributed architecture, where various components are situated remote from one another, but can be accessed by the processor 710.

The software in the computer readable memory 720 may include one or more separate programs, each of which comprises an ordered listing of executable instructions for implementing logical functions. The software in the memory 720 includes a suitable operating system (O/S) 750, compiler 740, source code 730, and one or more applications 760 of the exemplary embodiments. As illustrated, the application 760 comprises numerous functional components for implementing the features, processes, methods, functions, and operations of the exemplary embodiments. The application 760 of the computer 700 may represent numerous applications, agents, software components, modules, interfaces, controllers, etc., as discussed herein but the application 760 is not meant to be a limitation.

The operating system 750 may control the execution of other computer programs, and provides scheduling, input-output control, file and data management, memory management, and communication control and related services.

The application(s) 760 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 760 may be a source program, executable program (object code), script, or any other entity comprising a set of instructions to be performed. When a source program, then the program is usually translated via a compiler (such as the compiler 740), assembler, interpreter, or the like, which may or may not be included within the memory 720, so as to operate properly in connection with the O/S 750. Furthermore, the application 760 can be written as (a) an object oriented programming language, which has classes of data and methods, or (b) a procedure programming language, which has routines, subroutines, and/or functions.

The I/O devices 770 may include input devices (or peripherals) such as, for example but not limited to, a mouse, keyboard, scanner, microphone, camera, etc. Furthermore, the I/O devices 770 may also include output devices (or peripherals), for example but not limited to, a printer, display, etc. Finally, the I/O devices 770 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 770 also include components for communicating over various networks, such as the Internet or an intranet. The I/O devices 770 may be connected to and/or communicate with the processor 710 utilizing Bluetooth connections and cables (via, e.g., Universal Serial Bus (USB) ports, serial ports, parallel ports, FireWire, HDMI (High-Definition Multimedia Interface), etc.).

When the computer 700 is in operation, the processor 710 is configured to execute software stored within the memory 720, to communicate data to and from the memory 720, and to generally control operations of the computer 700 pursuant to the software. The application 760 and the O/S 750 are read, in whole or in part, by the processor 710, perhaps buffered within the processor 710, and then executed.

When the application 760 is implemented in software it should be noted that the application 760 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 760 can be embodied in any computer-readable medium 720 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 720 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical).

In exemplary embodiments, where the application 760 is implemented in hardware, the application 760 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 700 includes non-limiting examples of software and hardware components that may be included in various devices, servers, and systems discussed herein, and it is understood that additional software and hardware components may be included in the various devices and systems discussed in exemplary embodiments.

Figure 8:
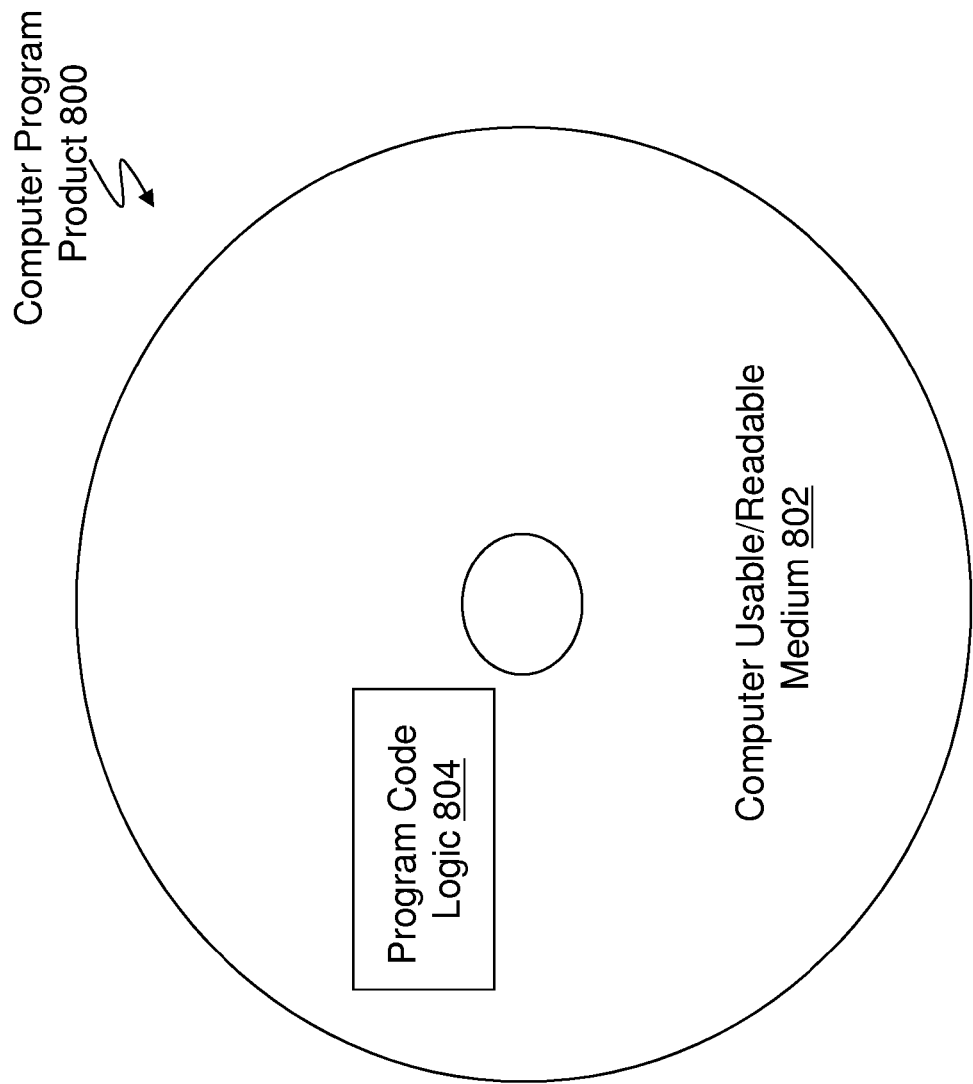
FIG. 8 illustrates an example of a computer program product on a computer readable/usable medium according to an embodiment of the present invention.

As described above, embodiments can be embodied in the form of computer-implemented processes and apparatuses for practicing those processes. An embodiment may include a computer program product 800 as depicted in FIG. 8 on a computer readable/usable medium 802 with computer program code logic 804 containing instructions embodied in tangible media as an article of manufacture. Exemplary articles of manufacture for computer readable/usable medium 802 may include floppy diskettes, CD-ROMs, hard drives, universal serial bus (USB) flash drives, or any other computer-readable storage medium, wherein, when the computer program code logic 804 is loaded into and executed by a computer, the computer becomes an apparatus for practicing the invention. Embodiments include computer program code logic 804, for example, whether stored in a storage medium, loaded into and/or executed by a computer, or transmitted over some transmission medium, such as over electrical wiring or cabling, through fiber optics, or via electromagnetic radiation, wherein, when the computer program code logic 804 is loaded into and executed by a computer, the computer becomes an apparatus for practicing the invention. When implemented on a general-purpose microprocessor, the computer program code logic 804 segments configure the microprocessor to create specific logic circuits.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer system for cache management, the system comprising:
    a processing circuit, and a cache, the system configured to perform a method comprising:
    tracking, by the processing circuit, a miss count and a hit position field for an instruction requesting access to a data element in the cache, the miss count and the hit position field generated by a previous execution of the instruction and saved in a tracking table;
    wherein the tracking table comprises the miss count and the hit position field associated with an instruction address for the instruction requesting access to the data element; and
    placing the data element in a hierarchical replacement order based on at least one of the miss count and the hit position field, the hit position field comprises a hierarchical position associated with the instruction related to the data element.

2. The computer system of claim 1, wherein based on the miss count not being set, the processing circuit places the data element in the hierarchical replacement order according to an inverted relationship of the hierarchical position stored in the hit position field; and
    wherein based on a cache hit, the processing circuit prevents the data element from moving higher in the hierarchical replacement order than the inverted relationship to the hierarchical position.

3. The computer system of claim 1, further comprising based on a conflict between the miss count and the hit position field, determining the hierarchical replacement order of the data element according to the miss count.

4. The computer system of claim 3, wherein processing the instruction according to the miss count comprises at least one of:
   placing the data element in a least recently used replacement position in the cache based on the miss count reaching a maximum value for the instruction; and
   not installing the data element in the cache based on the maximum value for the instruction saturating.

5. The computer system of claim 1, wherein the miss count and the hit position field are maintained for the instruction requesting the data element.

6. The computer system of claim 1, wherein the hierarchical position in the hit position field indicates a closest position to a least recently used replacement position in which a cache hit occurred for the data element during the previous execution of the instruction.

7. The computer system of claim 1, wherein determining the miss count and the hit position field during the previous execution of the instruction comprises determining a lowest hierarchical position as a new hierarchical replacement order for which a cache hit occurs for the data element in the cache; and
   storing the lowest hierarchical position determined for which the cache hit occurs as the hierarchical position in the hit position field.

8. The computer system of claim 7, wherein the instruction is a data fetch for an instruction address that corresponds to the data element in order for the data element to be stored in the cache.

9. A method for cache management, the method comprising:
   tracking, by a processing circuit, a miss count and a hit position field for an instruction requesting access to a data element in a cache, the miss count and the hit position field generated by a previous execution of the instruction and saved in a tracking table;
   wherein the tracking table comprises the miss count and the hit position field associated with an instruction address for the instruction requesting access to the data element; and
   placing the data element in a hierarchical replacement order based on at least one of the miss count and the hit position field, the hit position field comprises a hierarchical position associated with the instruction related to the data element.

10. The method of claim 9, wherein based on the miss count not being set, placing the data element in the hierarchical replacement order according to an inverted relationship of the hierarchical position stored in the hit position field; and
   wherein based on a cache hit, preventing the data element from moving higher in the hierarchical replacement order than the inverted relationship to the hierarchical position.

11. The method of claim 9, further comprising based on a conflict between the miss count and the hit position field, determining the hierarchical replacement order of the data element according to the miss count.

12. The method of claim 11, wherein processing the instruction according to the miss count comprises at least one of:
   placing the data element in a least recently used replacement position in the cache; and
   not installing the data element in the cache.

13. The method of claim 9, wherein the miss count and the hit position field are maintained for the instruction requesting the data element.

14. The method of claim 9, wherein the hierarchical position in the hit position field indicates a closest position to a least recently used replacement position in which a cache hit occurred for the data element during the previous execution of the instruction.

15. The method of claim 9, wherein determining the miss count and the hit position field during the previous execution of the instruction comprises determining a lowest hierarchical position as a new hierarchical replacement order for which a cache hit occurs for the data element in the cache; and
   storing the lowest hierarchical position determined for which the cache hit occurs as the hierarchical position in the hit position field.

16. The method of claim 15, wherein the instruction is a data fetch for an instruction address that corresponds to the data element in order for the data element to be stored in the cache.

17. A computer program product for cache management, the computer program product comprising:
   a tangible storage medium readable by a processing circuit and storing instructions for execution by the processing circuit for performing a method comprising:
   tracking, by the processing circuit, a miss count and a hit position field for an instruction requesting access to a data element in a cache, the miss count and the hit position field generated by a previous execution of the instruction and saved in a tracking table;
   wherein the tracking table comprises the miss count and the hit position field associated with an instruction address for the instruction requesting access to the data element; and
   placing the data element in a hierarchical replacement order based on at least one of the miss count and the hit position field, the hit position field comprises a hierarchical position associated with the instruction related to the data element.

18. The computer program product of claim 17, wherein based on the miss count not being set, placing the data element in the hierarchical replacement order according to an inverted relationship of the hierarchical position stored in the hit position field; and
   wherein based on a cache hit, preventing the data element from moving higher in the hierarchical replacement order than the inverted relationship to the hierarchical position.

19. The computer program product of claim 17, further comprising based on a conflict between the miss count and the hit position field, determining the hierarchical replacement order of the data element according to the miss count.

20. The computer program product of claim 19, wherein processing the instruction according to the miss count comprises at least one of:
   placing the data element in a least recently used replacement position in the cache; and
   not installing the data element in the cache.

* * * * *